United States Patent Office 2,808,817
Patented Oct. 8, 1957

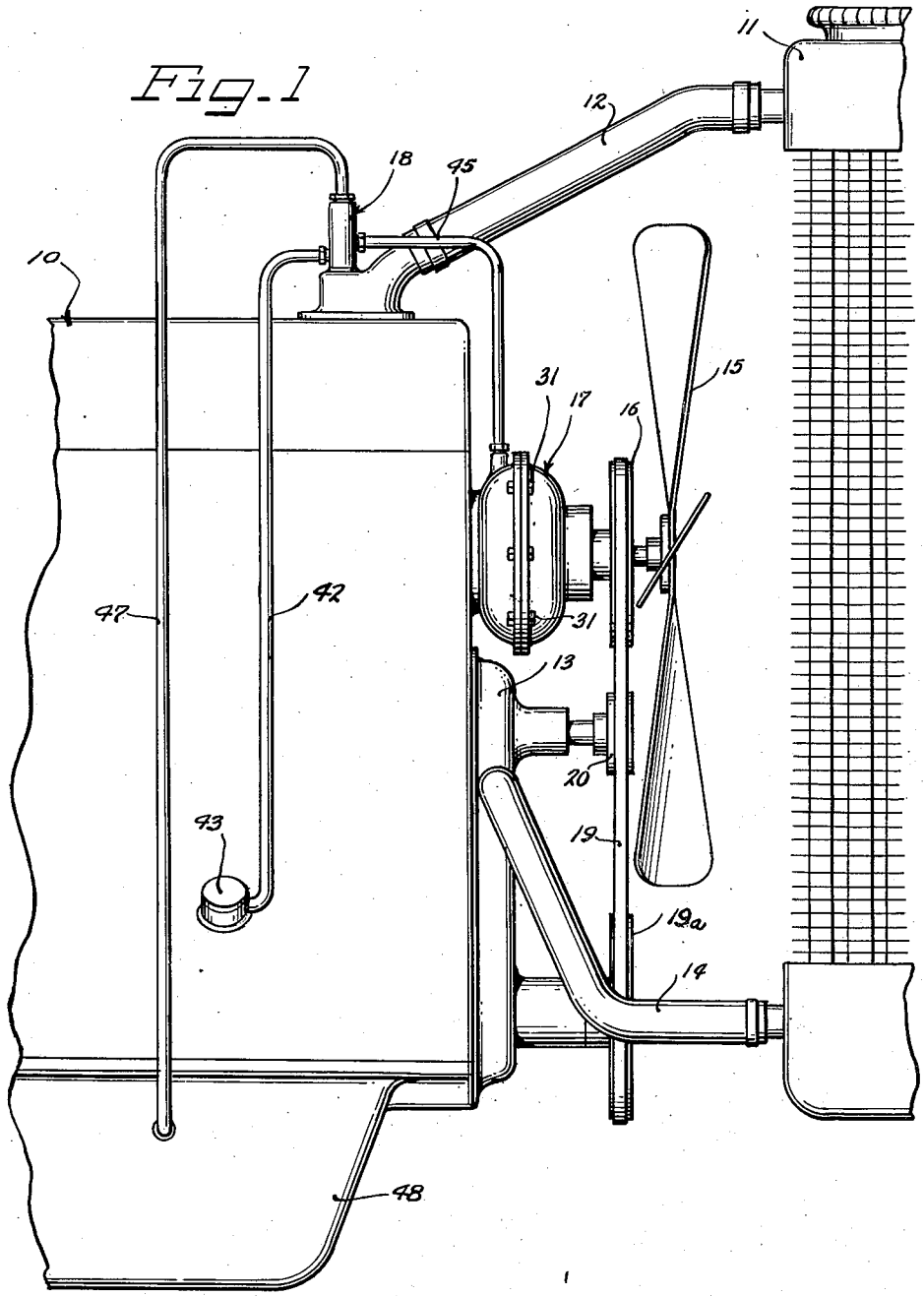

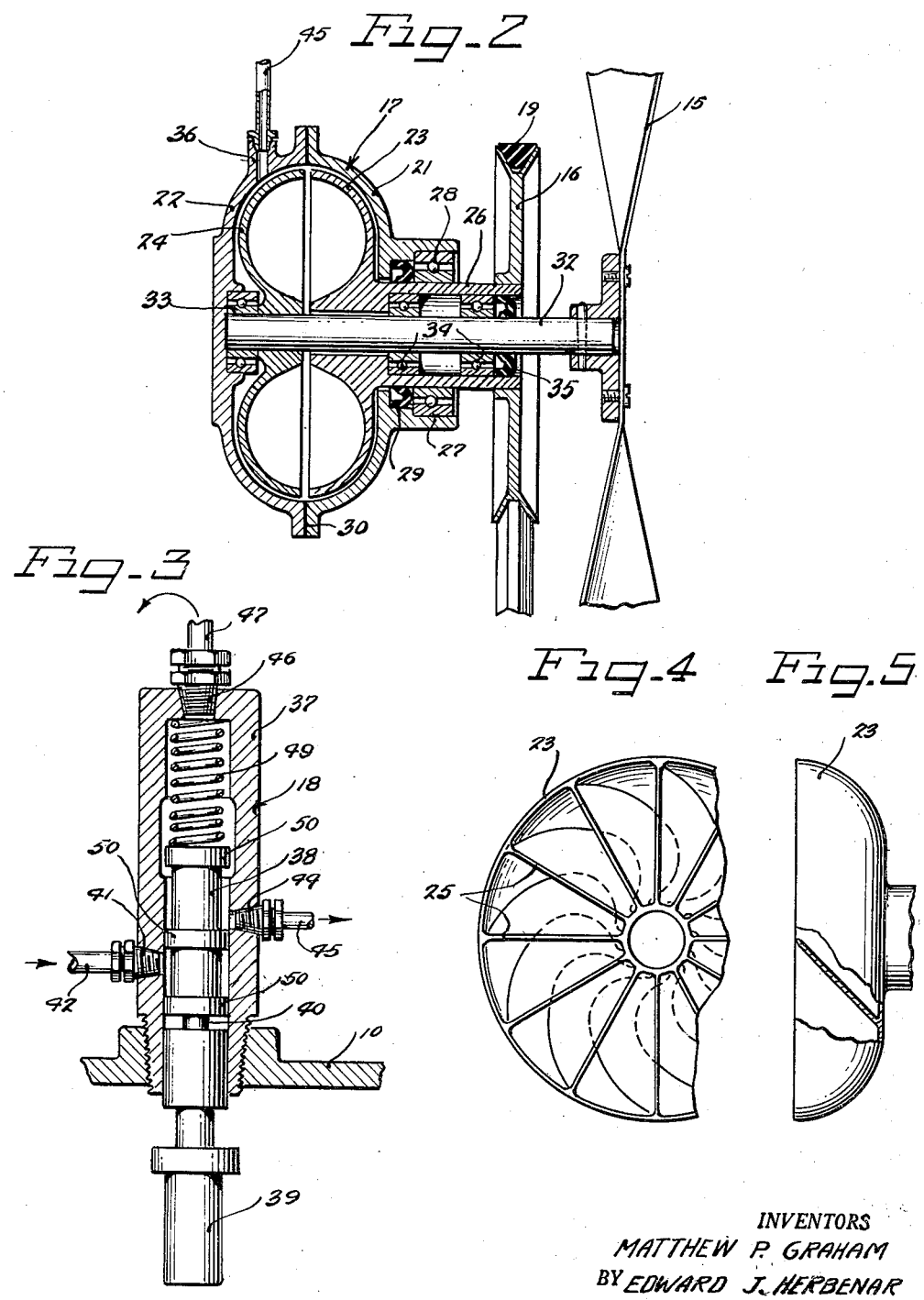

2,808,817

THERMOSTATICALLY CONTROLLED FAN AND COUPLING ASSEMBLY

Matthew P. Graham, Grosse Pointe, and Edward J. Herbenar, Detroit, Mich., assignors to Thompson Products, Inc., Cleveland, Ohio, a corporation of Ohio Application March 29, 1955, Serial No. 497,715

2 Claims. (Cl. 123—41.12)

This invention relates to improvements in fan drives, and more particularly to thermostatically controlled drives for cooling fans of internal combustion engines or the like, although the invention may have other uses and purposes as will be apparent to one skilled in the art.

In general, the invention deals with a variable speed fan drive for installation on an engine having a liquid cooling system and a pressurized oil lubrication system including, a fluid coupling having an impeller and a rotor, a continuously driven pulley connected to the impeller, a fan connected to the rotor through a shaft, a control valve associated with the oil system of the engine for controlling the fluid load on the fluid coupling, and a thermostatic element associated with the liquid cooling system of the engine for actuating the control valve. Upon the rising of engine temperatures, the control valve is actuated to increase the fluid load on the fluid coupling, and thereby increase the speed of the impeller and fan.

In the past, several types of fan drives have been developed to disconnect the drive to a cooling fan of an internal combustion engine when the engine temperature drops a predetermined amount. These devices included fan drives of highly complicated mechanical structure having several wearing parts, having electrical or mechanical controls, requiring independent lubrication arrangements, and in most cases, created undesirable vibration and noise during the engaging and disengaging of the fan drive. For these reasons, the manufacturers of internal combustion engines have refused to adapt the usage of variable speed fan drives.

Accordingly, it is an object of this invention to obviate the above named difficulties and provide a fan drive unit of simple and economical construction which may be readily adapted for cooling usage on an internal combustion engine or other apparatus equipped with a liquid cooling system and a pressurized oil lubrication system.

It is a further object of this invention to provide a fan drive unit capable of driving a fan at various speeds and capable of being automatically controlled by the cooling system of the engine.

Another object of this invention resides in the provision of a variable speed fan drive for internal combustion engines or the like having a liquid cooling system, a continuously driven pulley, and a fan, wherein the coupling between the pulley and fan utilizes oil or appropriate fluid as a medium for engaging and disengaging the elements, thereby eliminating any direct wearing of parts in the coupling, providing a self-lubricated drive assembly, providing smooth and quiet engagement and disengagement of the elements, and minimizing shock loads through an oil cushion.

Still another object of this invention is to provide a fan drive unit for internal combustion engines or the like having a liquid cooling system and a pressurized oil lubrication system, wherein the fan drive unit includes a fluid coupling which utilizes the engine oil pressure for controlling the speed of the fan drive.

A further object of this invention resides in the provision of a fan drive unit for internal combustion engines or the like having a liquid cooled system and a pressurized oil lubrication system, including a fluid coupling wherein the fluid load on the fluid coupling is thermostatically controlled by the engine temperature.

Still another object of this invention resides in the provision of a variable speed fan drive for internal combustion engines or the like having a liquid cooled system and a pressurized oil lubrication system wherein a fluid coupling is provided to connect a fan with a continuously driven pulley, and wherein a thermostatically actuated valve controls the fluid load on the fluid coupling in response to the engine temperature, thereby controlling the speed of the fan.

Other objects, features and advantages of this invention will be apparent from the following detailed description of the annexed sheets of drawings, which by way of a preferred example only, illustrate the invention:

On the drawings:

Figure 1 is a fragmentary side elevation view of an engine equipped with a fan drive unit in accordance with the present invention;

Figure 2 is an enlarged sectional view, showing some parts fragmentally, of the fluid coupling arrangement according to the invention;

Figure 3 is an enlarged sectional view, partly fragmentary, of the fluid coupling control valve in accordance with the invention;

Figure 4 is an enlarged fragmentary front elevational view of the impeller of the fluid coupling, illustrating the vane arrangement; and Figure 5 is an enlarged side elevational view, partly fragmentary, and with a portion cut away, of the impeller of Figure 4, illustrating the pitch of the vanes.

As shown on the drawings:

Referring generally to Figure 1, the fan drive unit of the present invention is illustrated as installed on a liquid cooled internal combustion engine generally indicated by the numeral 10, including a radiator 11 connected at its inlet to the engine head by a flexible hose 12 or equivalent means and to a coolant pump 13 at its lower discharge end through a flexible hose 14 or equivalent means.

The fan drive unit, in general, includes a fan 15, a continuously driven pulley 16, a fluid coupling for connecting the fan 15 to the pulley 16, generally indicated by the numeral 17, and a thermostatically actuated fluid control valve, generally indicated by the numeral 18. A drive pulley 19a is mounted on an extension of the engine crank shaft projecting from the front of the engine and continuously drives pulley 16 at engine speed through the medium of a V-belt 19. The belt 19 is also trained around a pulley 20 for driving the coolant pump 13.

Now referring to Figures 2 and 5, the fluid coupling 17 comprises, in general, front and back bell shaped housing sections 21 and 22, respectively, an impeller 23, and a rotor 24. The impeller 23, shown in detail in Figures 4 and 5, is provided with a plurality of equally spaced radial vanes 25 inclined 45° toward the direction of impeller rotation. Although the rotor 24 is not shown in detail, it is similar in construction to the impeller except that the vanes are inclined 45° away from the direction of rotor rotation.

The impeller 23 carries a forwardly projecting hollow hub portion 26, and carries at the very forward end which is suitably secured, such as by welding or otherwise, the pulley 16. The impeller 23 and the pulley 16 are supported by the hub portion 26 which is received in a centrally disposed aperture of the front housing portion 21 and rotatably supported within a forwardly extending hub portion 27 of the housing section by means of a bearing 28. A suitable flexible seal 29 surrounds the hub portion 26 and is received within an annular recess provided by an inwardly extending radial flange of the front bell housing section 21 and the bearing 28 to prevent the leakage of fluid or pressure from within the fluid coupling housing.

The housing sections 21 and 22 carry outwardly projecting flanges, between which a suitable gasket or seal 30 of ring shape is interposed, and through which a plurality of nut and bolt arrangements 31 (see Figure 1) are disposed to maintain the housing sections in sealed engagement.

The fan 15 is suitably mounted on the outer end of a shaft 32 which extends inwardly through the hollow hub portion 26, an enlarged bore in the impeller 23 to be suitably secured to the hub portion of rotor 24 for rotation therewith, such as by keying or other equivalent means. The extreme inner end of the shaft 32 is rotatable in an anti-friction bearing 33 held by the rear face of the back housing section 22, while an intermediate portion of the shaft 32 is supported by a pair of spaced bearings 34 held within the hollow hub portion 26 of the impeller 23. A suitable flexible seal or gasket 35 of ring shape snugly fits around the shaft 32 and within the outer end of the hollow hub portion 26 to prevent leakage of any fluid or pressure from the fluid coupling housing. It is noted that the bearings 33 and 34 are self-lubricated by the working of oil in the fluid coupling.

A fluid inlet 36 is provided in the back housing section 22 for receiving fluid under pressure to operate the coupling. When the fluid coupling is in operation, power is imparted to the pulley 16 and impeller 23, through the fluid as a medium to the rotor 24, the shaft 32 and the fan 15.

The control valve 18, as most clearly shown in Figure 3, includes a cylindrical casing 37 and a spool 38 actuable by thermostatic element 39 through a plunger 40. The casing 37 carries a tapered and threaded portion at its lower end which is received in sealing engagement by a tapered tap of the engine 10 in the area where the liquid coolant passes to return to the radiator 11. The thermostatic element 39 carries an enlarged circular portion which may be received, such as by press fit or otherwise at the lower end of the casing 18, thus allowing the thermostat to extend well within the passage of the coolant in the engine 10.

The thermostatic element is commonly called a vernathern and is of the same general type as shown and described in the Vernet Patent No. 2,368,181, issued January 30, 1945, and is also commonly known as a "Vernay" thermostatic element. The particular utility of this type of thermostatic element is in the positive action of the piston, having far more power than any other thermostatic element and a relatively long piston travel, together with the compact overall size of the element in comparison with other known thermostatic units. Since the vernathern is such a positive acting and powerful type of thermostatic unit, it is particularly desirable for use in conjunction with the present invention although other thermostatic units may be used. In a main casing of a thermostatic unit 39, a thermally expansible material of the type such as shown and described in Patent No. 2,259,846, which issued to Sergius Vernat on October 21, 1941, is employed. The thermally expansible material is contained in the casing whereas the thermostatic element acts against a membrane or deformable member (not shown) as it expands to extend the piston of the vernatherm upon predetermined rises in temperature and thereby axially protract the spool 38.

Now also referring to Figure 1, in the side wall of the casing 37 of the valve 18, an inlet 41 connects to a pressure line 42, which, in turn, is connected to an engine oil pressure source 43, such as the oil pump or engine oil pressure line of the engine. Also provided in the casing 37 opposite from the inlet 41 and at a higher level is an outlet 44 which connects to a load and unload line 45, the latter leading to the inlet 36 of the fluid coupling 17. At the top or head end of the casing 37 is provided a return element 46 connecting to an unload line 47, which, in turn connects to a non-pressurized section of a lubrication system of the engine, such as the crank case 48.

The spool 38 is constantly urged to the position shown in Figure 3 by a helical spring 49, and the spool carries plurality of lands or enlarged portions 50 which snugly engage the lower inner bore portion of the casing 37 to provide annular chambers within the casing.

In operation, below a predetermined operating temperature of the coolant in the cooling system, the control valve will remain in the position as shown in Figure 3, wherein the pressure line 42 is closed to fluid coupling 17 by virtue of the intermediate land 50 being positioned between the inlet 41 and the outlet 44, thus allowing any fluid in the fluid coupling housing to be pumped back to the crank case 48 by the impeller 23, the fluid passing through the inlet-outlet 36, the load and unload line 45, the outlet 44 of the valve 18 upwardly and around the top land 50 through the return outlet 46, and the unload or return line 47.

As the temperature of the coolant in the engine gradually rises, the plunger 40 of the thermostatic element 39 is protracted to raise the spool 38 against the action of the spring 49 and gradually allow communication between the oil pressure line 42 and the load and unload line 45 through the annular chamber between the intermediate and lower lands 50, and at the same time the intermediate land 50 of the spool 38 will close off the communication between the load and unload line 45 and the return or unload line 47. During this operation, the engine oil under operating pressure is forced into the fluid coupling 17 compressing the air therein and filling it with sufficient fluid to cause the impeller 23 and rotor 24 to rotate substantially together and thereby drive the fan 15 through shaft 32. Depending on the actuation of the thermostat 39 and the axial movement of the spool 38 within the casing 37, a varying amount of communication between the oil pressure line 42 and the load and unload line 45 will be obtained to vary the slip and driving relationship between the impeller 23 and the rotor 24 of the fluid coupling and thereby vary the speed of the fan 15. It is then seen that the fan 15 will continue to be driven until the temperature of the coolant in the engine 10 drops below a predetermined operating temperature, at which time the spool 38 will be forced downwardly by the spring 49 and the unload cycle of the fluid coupling will commence.

It will be understood that modifications and variations may be effected without departing from the scope of the novel concepts of the present invention, but it is understood that the application is to be limited only by the scope of the appended claims.

We claim as our invention:

1. In a cooling fan drive for an internal combustion engine having a liquid cooling system, a coolant pump and an engine oil system, a pulley continuously driven by said engine, a fan rotatably mounted on a shaft, a fluid coupling including an impeller driven by said pulley and a rotor drivingly secured to said shaft, a fluid inlet to said coupling, a control valve having a bore with a reciprocable valve core therein, a pressure line connecting said valve bore to the engine oil pressure source; a load and unload line connecting said valve bore to the fluid coupling inlet, a return line connecting said valve bore to a non-pressurized section of the engine oil system, and a thermostat communicating with said liquid cooling system for actuating said control valve to connect said load line with said pressure line upon attainment of a predetermined liquid temperature, said core having passages therein adapted to selectively connect said load line to said return line or said load line to said pressure line and at all times preventing flow from said pressure line to said return line, whereby a rise in temperature in said cooling system to said predetermined temperature will cause the thermostat to actuate the valve core and direct oil under pressure to flow from the oil pressure source to the fluid coupling to energize the same and drive said fan.

2. In a cooling fan drive for an internal combustion engine having a liquid cooling system, a coolant pump and an engine oil system, a pulley continuously driven by said engine, a fan rotatably mounted on a shaft, a fluid coupling including an impeller driven by said pulley and a rotor drivingly secured to said shaft, a fluid inlet to said coupling, a control valve having a bore with a reciprocable valve core therein, a pressure line connecting said valve bore to the engine oil pressure source, a load and unload line connecting said valve bore to the fluid coupling inlet, a return line connecting said valve bore to a non-pressurized section of the engine oil system, and a thermostat communicating with said liquid cooling system for actuating said control valve to connect said load line with said pressure line upon a return line connecting said valve bore to a non-pressurized section of the engine oil system, and thermostat communicating with said liquid cooling system for actuating said control valve to connect said load line with said pressure line upon attainment of a predetermined liquid temperature, said core having passages thherein adapted to selectively connect said load line to said return line or said load line to said pressure line, and means normally biasing said core into a position venting said load line to said return line and blocking off said pressure line, whereby a rise in temperature in said cooling system to said predetermined temperature will cause the thermostat to actuate the valve core and direct oil under pressure to flow from the oil pressure source to the fluid coupling to energize the same and drive said fan.

References Cited in the file of this patent
UNITED STATES PATENTS

| | | |
|---|---|---|
| 1,256,709 | Ludeman | Feb. 19, 1918 |
| 2,289,440 | Kugel | July 14, 1942 |
| 2,406,486 | Bonham | Aug. 27, 1946 |
| 2,633,697 | Johnson | Apr. 7, 1953 |